United States Patent Office 3,360,545
Patented Dec. 26, 1967

3,360,545
PROCESSES FOR PREPARING BIS(HYDROXY-ALKYL)FUMARATES
James C. Wygant, Creve Coeur, Mo., assignor to Monsanto Company, a corporation of Delaware
No Drawing. Filed Aug. 27, 1963, Ser. No. 304,961
16 Claims. (Cl. 260—485)

This invention relates to processes for preparing bis(hydroxyalkyl)fumarates and is directed towards the catalyzed reaction of alkylene oxides with fumaric acid where the fumaric acid is suspended in an inert solvent and the reaction is run until a product having a certain acid number is obtained.

Bis(hydroxyalkyl)fumarates are particularly desirable monomers and can be copolymerized with vinyl chloride and other compounds having olefinic unsaturation. The resulting copolymers have free hydroxyl groups which provide sites for further reaction, e.g., crosslinking, etc.

Bis(hydroxyalkyl)fumarates are reported to be preparable by reacting fumaronitrile with a polyhydric alcohol at about 150°–280° centigrade. Water is required for the reaction and it is desirable to use excess alcohol. Only a limited conversion is obtained.

It is an object of the present invention to provide a process for preparing bis(hydroxyalkyl)fumarates in high yield which process is suitable for industrial use.

Another object of this invention is to provide a process for preparing bis(hydroxyalkyl)fumarates of high purity.

Another object is to provide a single-step process for preparing bis(hydroxyalkyl)fumarates starting with fumaric acid.

Another object is to provide a practical catalytic process for preparing bis(hydroxyalkyl)fumarates from fumaric acid and alkylene oxides.

Another object is to provide catalysts for use in preparing bis(hydroxyalkyl)fumarates produced by the alkylene oxide reaction which catalysts can readily be removed from the reaction mixture.

Another object is to provide suitable solvents in which to carry out the reaction between fumaric acid and an alkylene oxide.

Another object is to provide a process which will produce bis(hydroxyalkyl)fumarates in high conversion.

The processes of the present invention comprise reacting an 1,2-alkylene oxide with fumaric acid as set forth below:

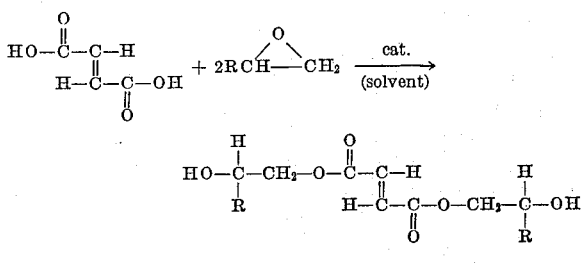

where R is hydrogen or a lower alkyl radical having no more than about eight carbon atoms (i.e., the alkylene oxide has no more than about ten carbon atoms but at least two carbons) and preferably no more than about three carbons (i.e., the alkylene oxide has no more than about five carbons but at least two carbons).

Where R is lower alkyl R may be straight-chained, branched, or cyclic. Examples include methyl, ethyl, isopropyl, n-butyl, sec-butyl, n-amyl, n-hexyl, etc.

Preferably for present purposes R is hydrogen or methyl (i.e., the alkylene oxide is ethylene oxide or propylene oxide).

The alkylene oxide reaction according to this invention is catalyzed by introducing basic (i.e., nucleophilic) catalysts such as alkali or alkaline earth metal hydroxides and salts with weak inorganic or organic acids, e.g., carbonates, bicarbonates, carboxylates, etc.; nucleophilic phosphorus compounds, e.g., alkylphosphines, dialkylphosphines, trialkylphosphines, etc.; amine compounds, e.g., primary, secondary, and tertiary amines, quaternary ammonium compounds, amine oxides, aromatic N-heterocyclics such as pyridine and derivatives thereof, etc.

The term "alkyl" as used to described the phosphorus compounds refers broadly to alkyl groups, cycloalkyl groups, and arylalkyl groups.

Examples of alkali and alkaline earth metal catalysts include potassium carbonate, sodium bicarbonate, potassium acetate, rubidium acetate, sodium hydroxide, lithium acetate, barium carbonate, calcium carbonate, calcium succinate, magnesium hydroxide, strontium carbonate, etc.

Examples of nucleophilic phosphorus catalysts include triphenylphosphine, tributylphosphine, diethylphosphine, phenylphosphine, benzyldimethylphosphine, etc.

Examples of basic amine catalysts include aniline, dimethylaniline, triethylamine, diethylamine, n-propylamine, ethylenediamine, tri-n-propylamine, diphenylamine, triphenylamine, pyridazine, pyrimidine, quinoline, trimethylamine oxide, bis(benzyltrimethylammonium)fumarate, tetraethylammonium acetate, β-picoline, etc.

The catalysts herein employed probably function by forming a salt or like compound with fumaric acid. The phosphine and amine catalysts form quaternary salts which are generally more soluble in the reaction solvent than the corresponding alkali and alkaline earth metal salts. For this reason phosphine catalysts and amine compound catalysts are the preferred catalysts for use herein.

Particularly preferred catalysts are the trialkylphosphines, the tertiary amines, and the aromatic heterocyclic amines. The trialkylphosphines have no hydrogens attached directly to the phosphorus atom and the tertiary amines and aromatic N-heterocyclics have no hydrogens located on their nitrogen atoms. Therefore there can be no side reaction with the alkylene oxide as is possible when dialkylphosphines, secondary and primary amines, etc., are employed as catalysts.

For convenience the following discussion to some extent is limited to the preferred embodiment of the invention, i.e., a detailed description of the reaction products is presented for the reaction of ethylene oxide with fumaric acid.

Fumaric acid and ethylene oxide react according to the conditions employed to produce several product types:

(A)

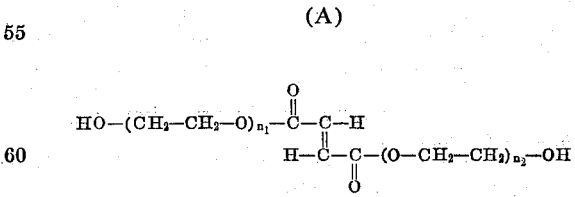

where $n_1$ and $n_2$ are integers $\geq 1$.

Specific examples:

$n_1 = n_2 = 1$, bis(2-hydroxyethyl) fumarate;

$n_1 = 1$; $n_2 = 2$, 2-hydroxyethyl 2-(2'-hydroxyethoxy)ethyl fumarate;

$n_1 = n_2 = 2$, bis[2-(2'-hydroxyethoxy)ethyl] fumarate; etc.

(B)

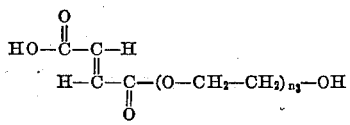

where $n_3$ is an integer $\geq 1$.

Specific examples:

$n_3=1$, 2-hydroxyethyl hydrogen fumarate;
$n_3=2$, 2-(2'-hydroxyethoxy)ethyl hydrogen fumarate; etc.

(C)

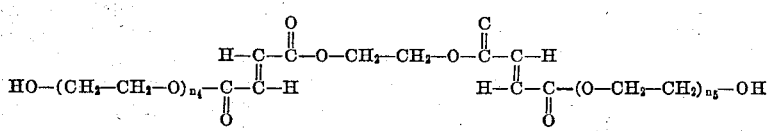

where $n_4$ and $n_5$ are integers $\geq 0$.

Specific examples:

$n_4=n_5=0$, ethylene glycol bis(hydrogen fumarate);
$n_4=n_5=1$, ethylene glycol bis(2-hydroxethyl fumarate);
$n_4=0$; $n_5=1$, ethylene glycol (2-hydroxyethyl fumarate) (hydrogen fumarate); etc.

Structure A ($n_1=n_2=1$) is the primary product of the reaction. Structure A ($n_1=1$ and $n_2=2$) is the reaction product of the main product A with an additional molecule of ethylene oxide. This by-product is formed to the extent of 5-9% of the reaction mixture. Normally the higher homologues of structure A are produced in very small quantities and their presence in the product blend is not objectionable.

Structure B ($n_3=1$) probably serves as an intermediate for preparing the bis(hydroxyalkyl)fumarate. Structure B ($n_3 \geq 2$) are polymers formed by condensation of additional molecules of ethylene oxide. These higher homologues are present in only small amounts.

Structure C is produced by ester interchange reactions and being a bis-fumarate can lead to insoluble, crosslinked polymers. Therefore it is necessary to control the reaction conditions to keep its concentration at a low level.

By the processes of the present invention it is possible to choose and control the reaction conditions to produce bis(2-hydroxyethyl)fumarate in high yield and with a minimum amount of ethylene glycol bis-fumarate being formed.

The alkylene oxide reaction according to this invention is carried out as a liquid phase reaction utilizing an inert organic solvent (i.e., a non-aqueous solvent). Examples of solvents include hydrocarbons, e.g., benzene, toluene, xylene, cyclohexane, n-heptane etc.; ethers, e.g., isopropyl ether, n-butyl ether, 1,4-dioxane, isobutyl ether, etc.; ketones, e.g., methyl isopropyl ketone, methyl isobutyl ketone, methyl isoamyl ketone, diisopropyl ketone, cyclohexanone, etc.; alcohols, e.g., n-propyl alcohol, isobutyl alcohol, t-amyl alcohol, n-hexyl alcohol, etc.; organic halides, e.g., carbon tetrachloride, n-butyl chloride, ethylene dichloride, tetrachloroethylene, etc.; esters, e.g., ethyl acetate, n-propyl acetate, methyl n-butyrate, isobutyl acetate, amyl acetate, etc.

Preferred solvents are those that provide the best balance between solvent power for fumaric acid and inertness to the alkylene oxide. Prime examples of such preferred solvents are the ketones and ethers listed in the preceding paragraph.

The amount of solvent for the alkylene oxide reaction can be varied over a wide range. At least enough should be used to provide a stirrable slurry and the maximum limit is dictated only by the size of the reaction vessel available. However, the amount of solvent used is generally from about fifty to five hundred percent based on the weight of fumaric acid in the charge. Commonly the quantity of solvent employed is in the range from about fifty to one hundred and fifty percent by weight of the fumaric acid present.

Preferably about two to five weight equivalent percent of catalyst based on fumaric acid is used to catalyze the alkylene oxide reaction. Higher amounts of catalyst, such as ten weight equivalent percent or more based on fumaric acid can be used, however this causes a correspondingly reduced yield of product. On the other hand as little as about one equivalent percent based on the fumaric acid can be used by extending the reaction time.

A polymerization inhibitor to protect against vinyl polymerization may be added to the charge. As a rule such inhibitors are not required but sometimes are desirable in certain embodiments. Common polymerization inhibitors include p-(t-butyl) catechol, hydroquinone, benzoquinone, p-phenylene diamine, trinitrobenzene, picric acid, etc. Where a polymerization inhibitor is desired, it is generally introduced in about one-tenth to fifty parts per thousand based on the weight of fumaric acid employed.

Reaction temperature is generally maintained between about fifty and two hundred and fifty degrees centigrade. As a rule the most suitable temperature range is from about fifty to one hundred and twenty-five degrees centigrade.

The pressure at which the reaction is run is noncritical but commonly will be from about one to two atmospheres though much higher pressures can be employed.

Reaction is started by passing alkylene oxide or alkylene oxide contained in an inert diluent (e.g., nitrogen, methane, etc.) into the reaction vessel.

The flow of alkylene oxide is continued and reaction is allowed to proceed until a product having the desired acid number is obtained. Careful control must be exercised to terminate the reaction at the proper time. The reaction mixture, after the solvent has been removed, should have a final acid number of about five to thirty and, preferably, of about five to fifteen.

If the alkylene oxide reaction is stopped when the mixture has a higher acid number there will be a large percentage of unconverted fumaric acid and/or hydroxyalkyl hydrogen fumarate. If the reaction is continued until the acid number drops to below about five a large amount of alkylene glycol bis(alkyl fumarate) begins to form. The alkylene glycol bis(alkyl fumarate) renders the product blend unsuitable for subsequent use as a monomer because it causes undesirable crosslinking reactions.

Therefore it is impractical to attempt to achieve complete conversion of fumaric acid to bis(hydroxyalkyl) fumarate and reaction must be halted before an acid number much less than five is reached. However, the reaction should be run so as to obtain as low an acid number as possible observing this limitation.

*Example 1*

To a reactor equipped with stirrer, thermometer, gas inlet adapter, condenser, and outlet connected to a mercury manometer is charged 116 g. (1 mole) of fumaric acid, 116 g. (145 ml.) of methyl isobutyl ketone, 3.2 g. (2 equivalent percent) of pyridine, and 0.23 g. p-(t-butyl) catechol. The flask is flushed with nitrogen and ethylene oxide. The stirrer is started and the reactor is heated to about 90° C. Ethylene oxide is fed into the vessel to start the reaction and its flow is adjusted to maintain a positive pressure of about 35 cm. of mercury. After the fumaric acid is nearly dissolved a sample is taken, the solvent distilled off, and the product residue titrated with standard KOH solution to determine its acid number.[1] This procedure is repeated at set intervals until the acid number is in the range from 5–7. The flow of ethylene oxide is then stopped and the reactor vented and flushed with nitrogen. When the reaction mixture is cooled bis(2-hydroxyethyl)fumarate separates as a crystalline solid and is recovered in good yield.

The bis(2-hydroxyethyl)fumarate so obtained contains about 8% of the co-product 2-hydroxyethyl 2-(2'-hydroxyethoxy)ethyl fumarate (determined by gas chromatography analysis) and melts at 50°–57° C.

Analysis.—Calc'd. for $C_8H_{12}O_6$: C, 47.1; H, 5.9; Sap. Eq. 102. Found: C, 47.4; H, 6.2; Sap. Eq. 102.

Example 2

The apparatus and procedure described in Example 1 is employed substituting 4.1 g. (2 equivalent percent) of triethylamine for the pyridine. Bis(2-hydroxyethyl)fumarate is obtained in good yield.

Example 3

The apparatus and procedure described in Example 1 is employed using n-butyl ether as solvent instead of methyl isobutyl ketone. Bis(2-hydroxyethyl)fumarate is recovered in good yield.

Example 4

The apparatus and procedure described in Example 1 is employed except that no polymerization inhibitor is used. Bis(2-hydroxyethyl)fumarate is still recovered in good yield.

Example 5

The apparatus and procedure described in Example 1 is employed substituting 10.5 g. (2 equivalent percent) of triphenylphosphine for the pyridine.

Example 6

The apparatus and procedure described in Example 1 is employed substituting 8.1 g. (2 equivalent percent) of tributylphosphine for the pyridine.

Example 7

The apparatus and procedure described in Example 1 is employed substituting 8.3 g. (2 equivalent percent) of bis(benzyltriethylammonium)fumarate for the pyridine.

Example 8

The apparatus and procedure described in Example 1 is employed substituting t-amyl alcohol for the methyl isobutyl ketone.

Example 9

To a reactor equipped with stirrer, thermometer, addition funnel, condenser and a sampling part fitted with a rubber septum is charged 116 g. (1 mole) of fumaric acid, 116 g. (145 ml) of methyl isobutyl ketone, and 3.2 g. (2 equivalent percent) of pyridine. One hundred twenty-eight g. (2.2 moles) of propylene oxide is charged to the addition funnel. The apparatus is flushed with nitrogen, the stirrer started, and the slurry heated to ca. 90° C. Propylene oxide is then added at a dropwise rate maintaining the temperature ca. 90° C. After ca. 5 hours most of the fumaric acid has reacted and samples are taken at half hour intervals through the septum by means of a hypodermic syringe fitted with a long needle. The acid number of each test sample is determined by titration with standard KOH solution after evaporating the solvent. The acid number falls to ca. 5–7 when a 5–10% excess of propylene oxide has been added and the reaction is stopped. The methyl isobutyl ketone is evaporated under reduced pressure to provide bis(2-hydroxypropyl)fumarate, in good yield, which product can be further purified by distillation.

Analysis.—Calc'd. for $C_{10}H_{16}O_6$: C, 51.7; H, 7.0; Sap. Eq. 116. Found: C, 51.5; H, 6.8; Sap. Eq. 117.

Example 10

The apparatus and procedure described in Example 9 is employed using 4.1 g. (2 equivalent percent) of triethylamine as catalyst instead of pyridine. Bis(2-hydroxypropyl)fumarate is recovered in good yield.

Example 11

The apparatus and procedure described in Example 9 is employed using n-butyl ether as solvent instead of methyl isobutyl ketone. Bis(2-hydroxypropyl)fumarate is recovered in good yield.

Example 12

The apparatus and procedure described in Example 9 is employed using 10.5 g. (2 equivalent percent) of triphenylphosphine as catalyst instead of pyridine. Bis(2-hydroxypropyl)fumarate is recovered in good yield.

Example 13

The apparatus and procedure described in Example 9 is employed introducing butylene oxide instead of propylene oxide. Bis(2-hydroxybutyl)fumarate is recovered in good yield.

What is claimed is:

1. A process for preparing bis(2-hydroxyalkyl)fumarates which comprises reacting an 1,2-alkylene oxide which has no more than about five carbon atoms and fumaric acid suspended in an inert organic solvent in the presence of about one to ten weight equivalent percent of a basic catalyst selected from the group consisting of alkali metal hydroxides, carbonates and salts of organic carboxylic acids, alkaline earth metal hydroxides, carbonates and salts of organic carboxylic acids, phosphines having up to three alkyls attached to the phosphorus, phosphines having up to three phenyls attached to the phosphorus, monoalkyl amine, dialkyl amine, trialkylamine, aniline, N,N-dialkyl aniline, and pyridine, wherein the reaction temperature is maintained between about fifty and one hundred and twenty-five degrees centigrade and stopping the reaction when the acid number is about five to thirty.

2. The process of claim 1 where the catalyst is a trialkyl phosphine.

3. The process of claim 1 where the catalyst is an amine.

4. The process of claim 1 where the alkylene oxide is ethylene oxide.

5. The process of claim 1 where the alkylene oxide is propylene oxide.

6. A process for preparing bis(2-hydroxyalkyl)fumarates which comprises reacting an 1,2-alkylene oxide which has no more than about five carbon atoms and fumaric acid suspended in about fifty to five hundred percent its weight of an inert organic solvent selected from the group consisting of ketones and ethers in the presence of about two to five weight equivalent percent of a basic catalyst selected from the group consisting of alkali metal hydroxides, carbonates and salts of organic carboxylic acids, alkaline earth metal hydroxides, carbonates and salts of organic carboxylic acids, phosphines having up to three alkyls attached to the phosphorus, phosphines having up to three phenyls attached to the phosphorus, monoalkyl amine, dialkyl amine, trialkylamine, aniline, N,N-dialkyl aniline, and pyridine wherein the reaction temperature is maintained between about fifty and two hundred and fifty degrees centigrade and stopping the reaction when the acid number is about five to fifteen.

7. The process of claim 6 where the alkylene oxide is ethylene oxide.

---

[1] Acid number is a number which indicates the amount of free acid present in a substance. It is expressed by the number of mg. of potassium hydroxide which are required to neutralize the acid in a g. of the substance.

8. The process of claim 6 where the alkylene oxide is propylene oxide.

9. The process of claim 6 where the solvent is a ketone.

10. The process of claim 6 where the phosphorus compound is a trialkylphosphine.

11. The process of claim 6 where the catalyst is an amine.

12. The process of claim 11 where the amine is a tertiary amine.

13. The process of claim 11 where the amine is pyridine.

14. A process for preparing bis(2-hydroxyethyl)fumarate which comprises reacting ethylene oxide and fumaric acid in liquid phase in ketone solvent in the presence of about one to ten weight equivalent percent of tertiary amine catalyst wherein the reaction temperature is maintained between about fifty and one hundred and twenty-five degrees centigrade and stopping the reaction when the acid number is about five to thirty.

15. The method of claim 14 in which the catalyst is trialkylamine.

16. The method of claim 14 in which the catalyst is pyridine.

References Cited

UNITED STATES PATENTS 2,386,446  10/1945  De Groote et al. _____ 260—485
2,910,490  10/1959  Malkeneus _____ 260—485

LORRAINE A. WEINBERGER, *Primary Examiner.*

I. R. PELLMAN, R. K. JACKSON, T. L. GALLOWAY,
*Assistant Examiners.*